US009695771B2

(12) United States Patent
Hotta

(10) Patent No.: US 9,695,771 B2
(45) Date of Patent: Jul. 4, 2017

(54) SPARK AND VALVE CONTROL FOR DIFFERENT AIR/FUEL RATIOS

(71) Applicant: Toyota Jidosha Kabushiki Kaisha, Toyota-shi Aichi-ken (JP)

(72) Inventor: Shintaro Hotta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 287 days.

(21) Appl. No.: 14/563,147

(22) Filed: Dec. 8, 2014

(65) Prior Publication Data

US 2015/0167578 A1  Jun. 18, 2015

(30) Foreign Application Priority Data

Dec. 13, 2013  (JP) .................................. 2013-258345

(51) Int. Cl.
*F02D 41/00*   (2006.01)
*F02D 41/30*   (2006.01)
(Continued)

(52) U.S. Cl.
CPC .......... *F02D 41/3035* (2013.01); *F02B 37/18* (2013.01); *F02D 13/0207* (2013.01); *F02D 41/0007* (2013.01); *F02D 41/3064* (2013.01); *F02D 41/3094* (2013.01); *F02M 35/10177* (2013.01); *F02B 23/104* (2013.01); *F02B 29/0406* (2013.01); *F02B 2023/106* (2013.01); *F02B 2275/48* (2013.01); *F02D 2041/001* (2013.01); *F02D 2041/0015* (2013.01);
(Continued)

(58) Field of Classification Search
CPC .......... F02D 2041/001; F02D 41/3035; F02D 41/3064; F02D 41/3094; F02B 1/12; F02B 37/18; Y02T 10/18; F02M 35/10177
USPC .......................................................... 701/104
See application file for complete search history.

(56) References Cited

U.S. PATENT DOCUMENTS 5,848,529 A    12/1998  Katoh et al.
6,499,456 B1 * 12/2002  Nogi .................... F02B 1/12
                                                123/295
(Continued)

FOREIGN PATENT DOCUMENTS

JP    H10-082333 A    3/1998
JP    H10-252524 A    9/1998
(Continued)

*Primary Examiner* — Hai Huynh
*Assistant Examiner* — Gonzalo Laguarda
(74) *Attorney, Agent, or Firm* — Dinsmore & Shohl LLP

(57) ABSTRACT

An engine control device controls control amounts of a variable valve mechanism and a spark plug, the control amounts in a homogeneous lean operation region set in a first load region are different from that in a non-lean operation region which is a stoichiometric or rich operation region set in a second load region higher than the first load region. The control device performs control, in other operation region set in a third load region between the first and second load region, so that an air-fuel ratio of the internal combustion engine is equal to that of non-lean operation region, the control amount of the variable valve mechanism is equal to that of homogeneous lean operation region and the control amount of the spark plug is equal to that of the non-lean operation region in accordance with an operation amount of an accelerator pedal.

8 Claims, 7 Drawing Sheets

(51) Int. Cl.
*F02B 37/18* (2006.01)
*F02M 35/10* (2006.01)
*F02D 13/02* (2006.01)
F02B 23/10 (2006.01)
F02B 29/04 (2006.01)

(52) U.S. Cl.
CPC ............ *Y02T 10/125* (2013.01); *Y02T 10/144* (2013.01); *Y02T 10/146* (2013.01); *Y02T 10/18* (2013.01)

(56) References Cited

U.S. PATENT DOCUMENTS

2001/0025486 A1* 10/2001 Ogiso .................. F01L 9/04
60/285
2008/0276904 A1* 11/2008 Surnilla .............. F02D 41/0082
123/406.45
2009/0138181 A1   5/2009 Hokuto

FOREIGN PATENT DOCUMENTS

| JP | 11-280505 A | 10/1999 |
| JP | 2001-073819 A | 3/2001 |
| JP | 2003-328809 A | 11/2003 |
| JP | 2007-231810 A | 9/2007 |

* cited by examiner

Fig. 3

|  | REGION A | RICH-SPIKE IN REGION A OR REGION B | REGION C |
|---|---|---|---|
| VVT, WORKING ANGLE | HOMOGENEOUS LEAN 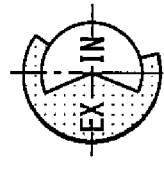 | STOICHIOMETRY<br>SAME AS REGION A | NORMAL STOICHIOMETRIC 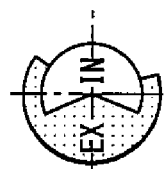 |
| INJECTION SHARING RATIO | PORT INJECTION RATIO = LARGE | SAME AS REGION A | DIRECT INJECTION RATIO = LARGE |
| DIRECT INJECTION FUEL PRESSURE | LOW | SAME AS REGION A | HIGH ATOMIZATION |
| TCV | CLOSE | SAME AS REGION A | OPEN |
| WGV | CLOSE | SAME AS REGION A | OPEN |
| IGNITION TIMING (MBT) | θPmax=12° ATDC | SAME AS REGION C | θPmax=15° ATDC |

SPARK AND VALVE CONTROL FOR DIFFERENT AIR/FUEL RATIOS

BACKGROUND OF THE INVENTION

Field of the Invention

The present invention relates to a control device for an internal combustion engine.

Background Art

Conventionally, as discussed, for example, in Japanese Patent Laid-Open No. 11-280505, a control device for an internal combustion engine is known that adjusts a valve overlap amount when switching between rich engine operation and lean engine operation. According to the internal combustion engine discussed in Japanese Patent Laid-Open No. 11-280505, together with calculating a deviation between a target value and an actual value of a valve overlap amount, a target air-fuel ratio is continuously switched in accordance with the deviation between the valve overlap amounts when switching between stoichiometric operation and lean operation.

Optimal control amounts for equipment (for example, a variable valve mechanism and a spark plug) of an internal combustion engine differ between a lean operation region and a stoichiometric or rich operation region. Generally, a control device controls an internal combustion engine by switching control amounts that are specified for a lean operation region and a stoichiometric or rich operation region, respectively, in accordance with maps for the respective operation regions. It is thereby possible to optimize control amounts in the respective operation regions and obtain favorable fuel consumption.

Other prior art includes Japanese Patent Laid-Open No. 2003-328809.

There are two kinds of lean combustion, namely, stratified lean combustion and homogeneous lean combustion. In comparison to an internal combustion engine that performs stratified lean combustion, an internal combustion engine that performs homogeneous lean combustion has the advantages that the amount of discharged NOx and PM are small and the costs are lower. Ideally, in an internal combustion engine that performs homogeneous lean combustion also, it is desired to change the control amounts of the internal combustion engine each time the air-fuel ratio is switched from lean to stoichiometric or from lean to rich.

After control amounts of an internal combustion engine are changed, there is a response delay until adjustment of an air intake amount and the like and adjustment of fuel injection is realized. In some cases, even when control amounts of an internal combustion engine are switched, adjustment of an air intake amount and the like that should be realized in a lean operation region occurs too late due to the aforementioned response delay. When such a situation is caused, there is the problem that there is a significant adverse effect on combustion stability during homogeneous lean combustion.

SUMMARY OF THE INVENTION

The present invention has been conceived to solve the above described problem, and an object of the present invention is to provide an internal combustion engine with a control device therefor that can achieve favorable combustion stability and suppression of fuel consumption when switching between homogeneous lean operation and operation under a stoichiometric or rich air-fuel ratio.

According to a first aspect of the present invention, an internal combustion engine includes a control device thereof, a variable valve mechanism, and a spark plug. The control device controls a first control amount of the variable valve mechanism and a second control amount of the spark plug, the first control amount and the second control amount in a homogeneous lean operation region are different from the first control amount and the second control amount in a non-lean operation region, the homogeneous lean operation region is set in a first load region, the non-lean operation region is a stoichiometric or rich operation region set in a second load region, and the second load region is higher than the first load region. The control device performs control, in other operation region set in a third load region, so that an air-fuel ratio of the internal combustion engine is equal to an air-fuel ratio of non-lean operation region, the first control amount of the variable valve mechanism is equal to a control amount of homogeneous lean operation region and the second control amount of the spark plug is equal to a control amount of the non-lean operation region in accordance with an operation amount of an accelerator pedal, the third load region is determined between the first load region and the second load region.

According to a second aspect of the present invention, the control device according to the first aspect may be provided as follows. The internal combustion engine may further include a port injection valve and an in-cylinder injection valve. The control device may control an injection sharing ratio and a fuel pressure, and at least one of the injection sharing ratio and the fuel pressure in the homogeneous lean operation region is different from the at least one in the non-lean operation region. The control device may perform control, in the other operation region set in a third load region, so that the at least one is equal to a value for the homogeneous lean operation region in accordance with an operation amount of an accelerator pedal.

According to a third aspect of the present invention, the control device according to the first aspect may be provided as follows. The internal combustion engine may further include a waste gate valve. The control device may control the waste gate valve so that in the homogeneous lean operation the waste gate valve is closed or a degree of opening of the waste gate valve is equal to a predetermined opening degree, and the degree of opening of the waste gate valve in the non-lean operation region is greater than a control amount of the waste gate valve for the homogeneous lean operation. The control device may perform control, in the other operation region set in a third load region, so that the degree of opening of the waste gate valve is equal to a value for the homogeneous lean operation region.

According to a fourth aspect of the present invention, the control device according to the first aspect may be provided as follows. The internal combustion engine may further include a tumble control valve. The control device may control the tumble control valve so that in the homogeneous lean operation the tumble control valve is closed or a degree of opening of the tumble control valve is equal to a predetermined opening degree, and the degree of opening of the tumble control valve in the non-lean operation region is greater than a control amount of the tumble control valve for the homogeneous lean operation. The control device may perform control, in the other operation region set in a third load region, so that the degree of opening of the tumble control valve is equal to a value for the homogeneous lean operation region.

According to a fifth aspect of the present invention, an internal combustion engine includes a control device thereof, a variable valve mechanism, and a spark plug. The control device controls a first control amount of the variable valve mechanism and a second control amount of the spark plug, the first control amount and the second control amount in a homogeneous lean operation region are different from the first control amount and the second control amount in a non-lean operation region, the homogeneous lean operation region is set in a first load region, the non-lean operation region is a stoichiometric or rich operation region set in a second load region, and the second load region is higher than the first load region. The control device performs control, when a rich-spike is executed, so that the first control amount of the variable valve mechanism is equal to a control amount of homogeneous lean operation region and the second control amount of the spark plug is equal to a control amount of the non-lean operation region, the rich-spike is a temporal stoichiometric or rich operation in the homogeneous lean operation.

According to a sixth aspect of the present invention, the control device according to the fifth aspect may be provided as follows. The internal combustion engine may further include a port injection valve and an in-cylinder injection valve. The control device may control an injection sharing ratio and a fuel pressure, at least one of the injection sharing ratio and the fuel pressure in the homogeneous lean operation region is different from the at least one in the non-lean operation region. The control device may perform control, when the rich-spike is executed, so that the at least one is equal to a value for the homogeneous lean operation region in accordance with an operation amount of an accelerator pedal.

According to a seventh aspect of the present invention, the control device according to the fifth aspect may be provided as follows. The internal combustion engine may further include a waste gate valve. The control device may control the waste gate valve so that in the homogeneous lean operation the waste gate valve is closed or a degree of opening of the waste gate valve is equal to a predetermined opening degree, and the degree of opening of the waste gate valve in the non-lean operation region is greater than a control amount of the waste gate valve for the homogeneous lean operation. The control device may perform control, when the rich-spike is executed, so that the degree of opening of the waste gate valve is equal to a value for the homogeneous lean operation region.

According to an eighth aspect of the present invention, the control device according to the fifth aspect may be provided as follows. The internal combustion engine may further include a tumble control valve. The control device may control the tumble control valve so that in the homogeneous lean operation the tumble control valve is closed or a degree of opening of the tumble control valve is equal to a predetermined opening degree, and the degree of opening of the tumble control valve in the non-lean operation region is greater than a control amount of the tumble control valve for the homogeneous lean operation. The control device may perform control, when the rich-spike is executed, so that the degree of opening of the tumble control valve is equal to a value for the homogeneous lean operation region.

According to the present invention, favorable combustion stability and suppression of fuel consumption can be achieved when switching between homogeneous lean operation and operation under a stoichiometric or rich air-fuel ratio.

BRIEF DESCRIPTION OF THE DRAWINGS

FIG. 3 is a view for describing control contents of the control device for an internal combustion engine according to the embodiment of the present invention;

DETAILED DESCRIPTION OF THE PREFERRED EMBODIMENTS

Figure 1:
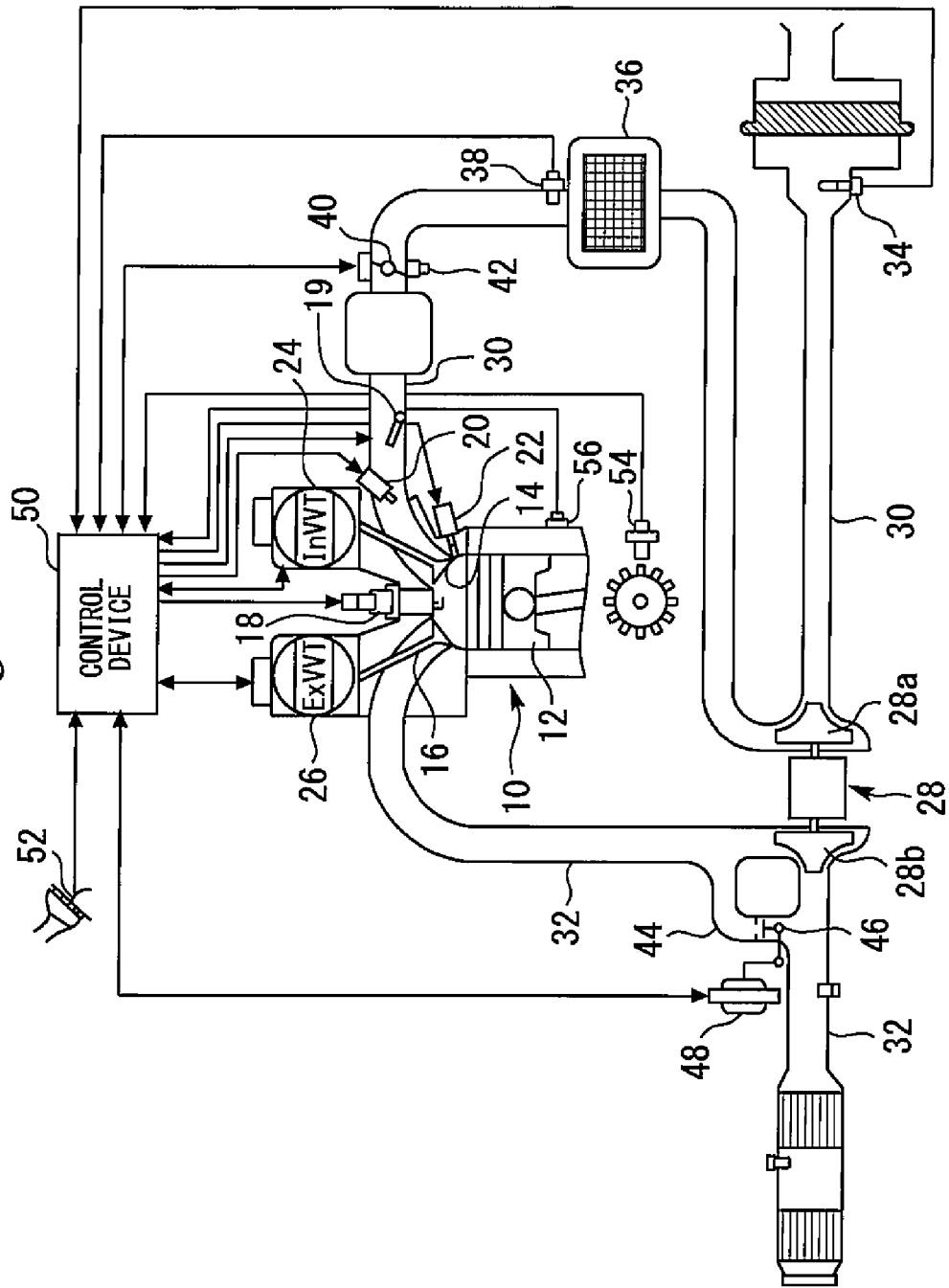
FIG. 1 is a view that illustrates a control device for an internal combustion engine according to an embodiment of the present invention as well as the system configuration of an internal combustion engine.

FIG. 1 is a view that illustrates a control device 50 for an internal combustion engine 10 according to an embodiment of the present invention as well as the system configuration of an internal combustion engine 10. As shown in FIG. 1, the system of the embodiment of the present invention, for example, includes the internal combustion engine 10 (hereunder, also referred to simply as "engine 10") that is mounted as a source of power in a vehicle. A piston 12, an intake valve 14, an exhaust valve 16, a spark plug 18, a port injection valve 20 that injects fuel into an intake port, and an in-cylinder injection valve 22 that injects fuel directly into a cylinder (into a combustion chamber) are provided in each cylinder of the engine 10. Fuel is supplied to the in-cylinder injection valve 22 in a state in which the fuel pressure has been increased through a high-pressure fuel pump that is connected to a fuel tank.

In the configuration illustrated in FIG. 1, an intake variable valve mechanism 24 that varies a valve opening characteristic of the intake valve 14 and an exhaust variable valve mechanism 26 that varies a valve opening characteristic of the exhaust valve 16 are provided in the engine 10. A known valve mechanism that varies at least one of a valve timing, a valve lift amount, and a working angle can be applied with respect to these variable valve mechanisms.

The engine 10 includes a turbocharger 28. The turbocharger 28 has an intake air compressor 28a and an exhaust turbine 28b. The intake air compressor 28a is arranged partway along an intake passage 30. The exhaust turbine 28b is arranged partway along an exhaust passage 32. A three-way catalyst and a NOx purification catalyst are provided in the exhaust passage 32.

An air flow meter 34 that detects an intake air amount Ga is provided in the intake passage 30 on an upstream side of the intake air compressor 28a. An intercooler 36 for cooling intake air that was compressed by the intake air compressor 28a is arranged on a downstream side of the intake air compressor 28*a*. An intake air temperature sensor 38 for detecting an intake air temperature Tmp is arranged on a downstream side of the intercooler 36. An electronically controlled throttle valve 40 for adjusting an intake air amount is arranged on a downstream side of the intake air temperature sensor 38. A throttle position sensor 42 that detects a degree of opening of the throttle valve 40 (hereunder, referred to as "degree of throttle opening") is arranged in the vicinity of the throttle valve 40.

A tumble control valve 19 is provided in the intake passage 30. The degree of opening of the tumble control valve 19 is controlled by the control device 50. A control amount of the tumble control valve 19 is also referred to as a "TCV control amount".

A bypass passage 44 that bypasses the upstream side and downstream side of the exhaust turbine 28*b* is provided in the vicinity of the exhaust turbine 28*b*. A waste gate valve 46 is arranged in the bypass passage 44. When the waste gate valve 46 opens, one part of the exhaust gas flows through the bypass passage 44 and does not flow through the exhaust turbine 28*b*. The waste gate valve 46 is driven by an actuator 48, and the degree of opening thereof is electronically controlled. A control amount of the waste gate valve 46 is also referred to as a "WGV control amount".

The system of the present embodiment also includes an accelerator position sensor 52 that detects the amount of depression of an accelerator pedal (degree of accelerator opening), a crank angle sensor 54 that detects a crank angle of the engine 10, and a knock sensor 56 that detects knocking that arises in the engine 10.

The various sensors and actuators described above are electrically connected to the control device 50. The control device 50 is an ECU (electronic control unit). The control device 50 controls the engine 10 by controlling the operations of the respective actuators based on signals from the respective sensors. More specifically, first the control device 50 calculates the required torque in accordance with the amount of depression of the accelerator pedal. Next, the control device 50 refers to a map for a region A or a map for a region C, which are described later, taking the required load (that is, the required air intake amount) that is obtained by conversion from the required torque and also the current engine speed as input values. Thereafter the control device 50 calculates the respective control amounts in accordance with the relevant map that is referred to. The respective actuators are controlled in accordance with the calculated control amounts.

Figure 2:
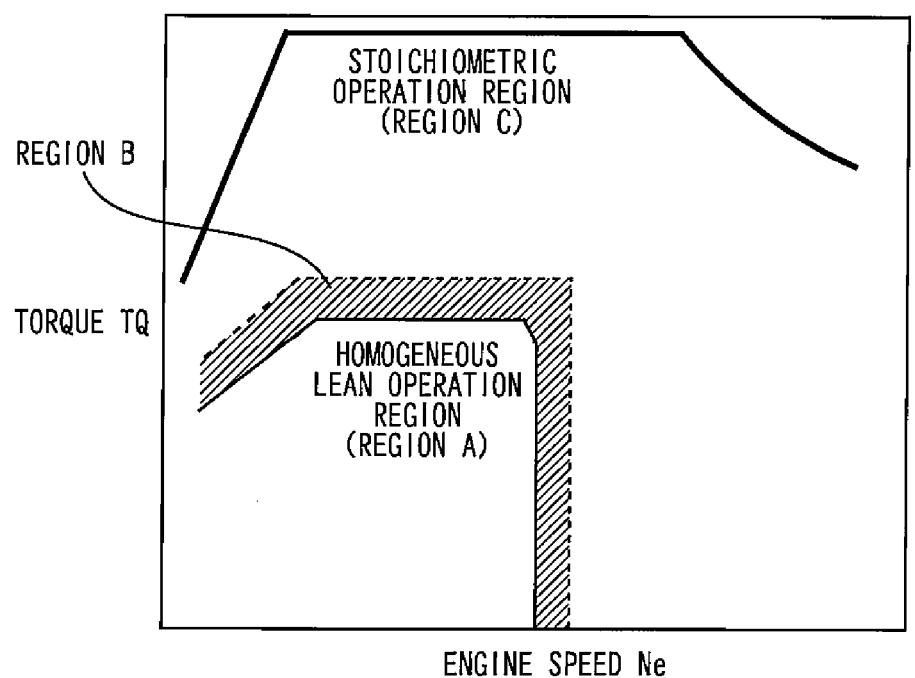
FIG. 2 is a view for describing control contents of the control device for an internal combustion engine according to the embodiment of the present invention.

FIG. 2 is a view for describing control contents of the control device for an internal combustion engine according to the embodiment of the present invention. A homogeneous lean operation region A (hereunder, also referred to simply as "region A"), a stoichiometric operation region C (hereunder, also referred to simply as "region C"), and a region B that is defined between region A and region C are shown in FIG. 2.

The control device 50 stores a map that is to be used for the region A and a map that is to be used for the region C. Control amounts for the intake variable valve mechanism 24 and the exhaust variable valve mechanism 26, a control amount relating to fuel injection, a TCV control amount, a WGV control amount, and a control amount for the ignition timing are set in these maps, respectively. The control device 50 executes control of the engine by switching between the maps in accordance with operation in region A and operation in region C. Note that in the case of only switching control amounts between a fixed value that is defined for region A and a fixed value that is defined for region C, a configuration may be adopted that merely switches between only two control amounts for region A and region C, and does not switch between maps.

FIG. 3 is a view for describing control contents of the control device for an internal combustion engine according to the embodiment of the present invention. FIG. 3 shows how control amounts for the variable valve mechanisms, control amounts relating to fuel injection, the TCV control amount, the WGV control amount and the control amount for the ignition timing are set for each of regions A, B and C. Note that, as described later, the setting for region B is also applied at the time of a rich-spike operation in region A.

First, control amounts for the variable valve mechanisms will be described. As shown in FIG. 3, a map is set for each of regions A and C so that the VVT (variable valve timing) and the working angle differ between region A and region C and also so that a valve overlap amount in region C is greater than in region A. As a result, in region A there are advantages such as securing favorable combustibility, while in region C there is the advantage that an internal EGR amount can be secured.

Next, control amounts relating to fuel injection, more specifically, an injection sharing ratio and a fuel pressure are described. First, a map of injection sharing amounts in region A is set so that the proportion for the port injection valve 20 is made larger than the proportion thereof in region C. It is thereby possible to ensure homogeneity. On the other hand, a map of injection sharing amounts in region C is set so that a direct-injection proportion, that is, the proportion for the in-cylinder injection valve 22 is made larger than the proportion thereof in region A. Thus, there are advantages with respect to the combustion rate, the charging efficiency and improvement of knocking characteristics.

Next, with respect to the pressure of fuel injected by the in-cylinder injection valve 22, maps defining control amounts of the high-pressure fuel pump are set so that the fuel pressure in region A is lower than in region C. By making the fuel pressure in region A low to suppress the amount of fuel injected by the in-cylinder injection valve 22 to a small amount, the port injection amount in region A can be increased as described above with respect to the injection sharing ratio. On the other hand, the maps are set so that the fuel pressure in region C is higher than in region A, to thereby ensure atomization of fuel when performing fuel injection in region C.

With respect to the TCV control amount and the WGV control amount, in the case of controlling the degrees of opening of the tumble control valve 19 and the waste gate valve 46 in accordance with operating conditions, maps may be created for region A and region C, respectively. In a case where control of the degrees of opening is not performed, and the respective degrees of opening of the tumble control valve 19 and the waste gate valve 46 are only the two stages of totally closed and totally open, a configuration may be adopted that does not switch between maps, and merely switches between the aforementioned degrees of opening.

First, the TCV control amount, that is, the TCV degree of opening will be described. For region A, a map is set so as to make the tumble control valve 19 close slightly, and thereby ensure turbulence of the intake air. In contrast, for region C a map is set so as to open the tumble control valve 19 more than in region A, to thereby enhance the flow coefficient.

Next, the WGV control amount, that is, the WGV degree of opening will be described. An intake air amount is secured by closing the waste gate valve 46 when operating in region A. In contrast, pumping loss is reduced by opening the waste gate valve 46 when operating in region C.

Next, the control amount of the spark plug 18, that is, the ignition timing will be described. The control device 50 stores an ignition timing map obtained by mapping MBTs for region A, and an ignition timing map obtained by mapping MBTs for region C. An MBT is determined based on a balance between the cooling loss and the exhaust loss, and the cooling loss is less under lean operation than under stoichiometric operation. Taking this tendency into consideration, in region A, the ignition timing is set so that a maximum in-cylinder pressure timing θPmax=12° ATDC. In contrast, in region C, the ignition timing is set so that the maximum in-cylinder pressure timing θPmax=15° ATDC, and thus the ignition timing in region C is retarded by θPmax=3° ATDC relative to region A.

Next, the respective control amounts for region B will be described. In region B, the VVT, the working angle, the injection sharing amount, the fuel pressure, the TCV control amount, and the WGV control amount are respectively set to control amounts that are equal to those in region A using the control map for region A. In contrast, the ignition timing in region B is set to a control amount that is equal to the control amount for the ignition timing in region C using a control map for region C.

Even if the VVT and working angle, the TCV control amount, and the WGV control amount are each changed, there is a response delay until an intended air intake amount, intake air turbulence, and supercharging pressure are reached. Hereunder, this response delay is also referred to as "intake air response delay". At a stage in which the engine is operating in region B, even in a case where it is expected that the operating region will transition from region A to region C, there is a possibility that the operating region will return to region A again without reaching region C. If the operating region returns to region A again, it means that the air-fuel ratio is controlled from lean→stoichiometric→lean in a short time. Further, in a case where a rich-spike operation is performed in region A, it means the air-fuel ratio is controlled from lean→stoichiometric (or rich)→lean in a short time. Even if control amounts are changed between control amounts for lean operation and control amounts for stoichiometric operation under these circumstances, it is difficult to secure combustion stability due to the intake air response delay, and it is thus difficult to perform homogeneous lean combustion.

Further, it takes time for the fuel pressure to be actually adjusted after control of the high-pressure fuel pump is executed, and hence there is also a response delay with respect to the fuel pressure control of the in-cylinder injection valve 22.

Therefore, for the control amounts related to the intake air response delay that are described above and the control amount for the fuel pressure control, the control amounts for region A are used at the time of operation in region B or at a time that a rich-spike operation is performed during operation in region A. It is thereby possible to ensure combustion stability when returning from region B to region A and also during a rich-spike operation.

Further, when changing the injection sharing ratio between the port injection amount and the direct injection amount, it is preferable not to switch the injection sharing ratio at frequent intervals. Due to reasons including the fact that the learned values of injection amounts also differ between a port injection amount and a direct injection amount, it is difficult to perform accurate air-fuel ratio control, and there is thus a risk that air-fuel turbulence will arise. Therefore, in the present embodiment, since there is a possibility that the operating region will return to region A, a configuration is adopted that does not change the injection sharing ratio in region B, and instead changes the injection sharing ratio at a stage at which region C is reached. The injection sharing ratio is also fixed with respect to a rich-spike operation, to thereby avoid frequently changing the injection sharing ratio.

On the other hand, the ignition timing can be changed without a response delay for each combustion cycle. Therefore, a control amount for region C that defines an ignition timing for stoichiometric operation is used in region B. It is thus possible to set the ignition timing to an MBT with respect to lean operation and stoichiometric operation, and fuel consumption can be suppressed.

Figure 4:
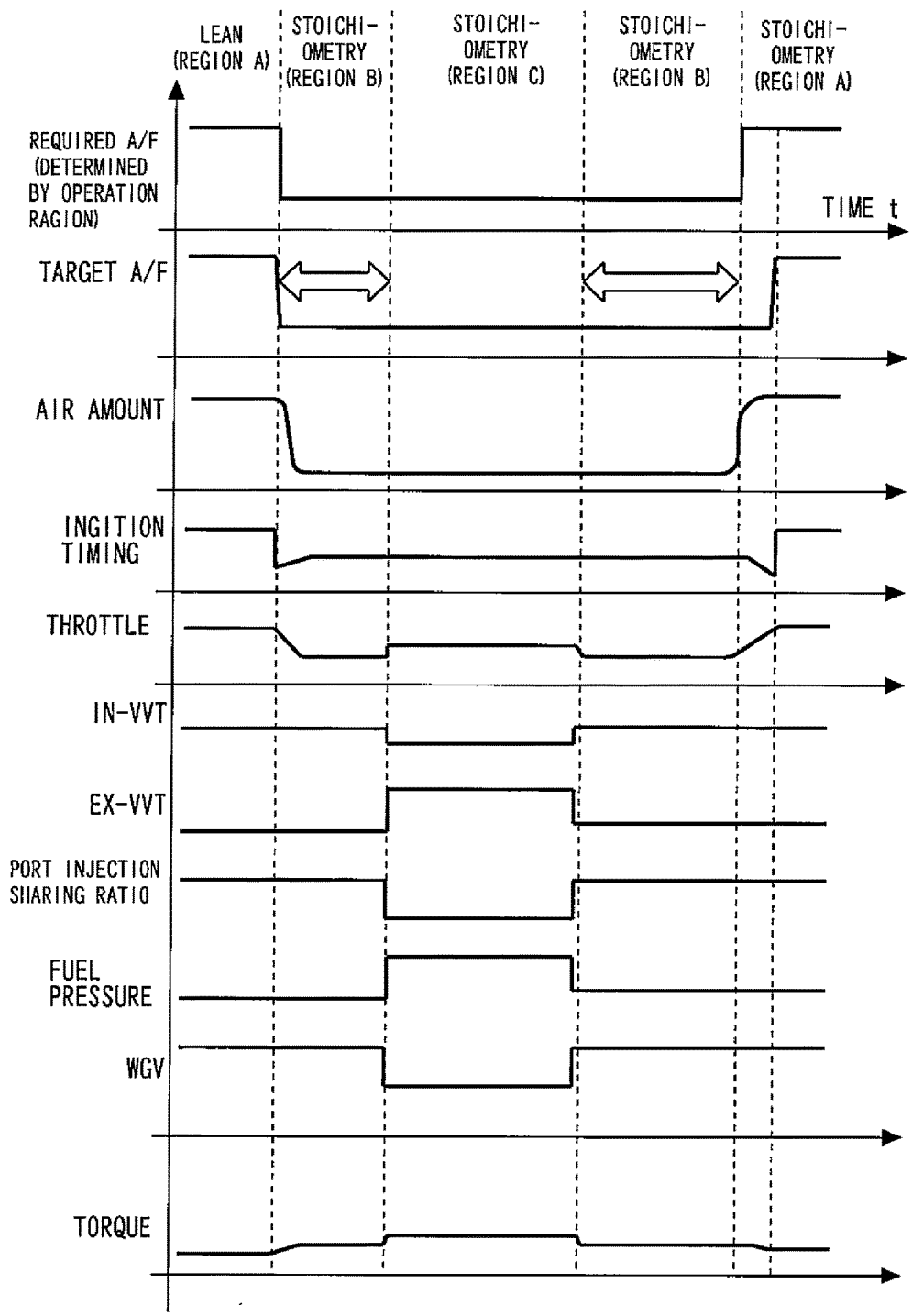
FIG. 4 is a timing chart illustrating operations of the control device for an internal combustion engine according to the embodiment of the present invention.

FIG. 4 is a timing chart illustrating operations of the control device for an internal combustion engine according to the embodiment of the present invention. FIG. 4 is a time chart illustrating operations in region B that straddles the homogeneous lean operation region A and the stoichiometric operation region C. The required air-fuel ratio during operation in region A is lean. FIG. 4 illustrates the manner in which the engine operation transitions from region A→region B→region C, and the manner in which the engine operation transitions from region C→region B→region A, respectively. Note that solid lines in FIG. 4 indicate control operations according to the present embodiment, and dashed lines are shown for comparison.

(1) Control when Transitioning from Region A to Region B

According to the present embodiment, when switching between region A and region B, a target air-fuel ratio is switched discontinuously from a lean air-fuel ratio (for example, an air-fuel ratio=26) to a stoichiometric air-fuel ratio, and a so-called intermediate air-fuel ratio, such as an air-fuel ratio=18, is not used. The intake air amount is changed in accordance with the target air-fuel ratio, and the degree of opening of the throttle valve 40 is also gradually decreased at the stage of transitioning from region A to region B.

As described above, the control amount for region C is used for the ignition timing in region B. That is, the ignition timing is controlled so that θPmax=12° ATDC in region A, whereas in region B the ignition timing is adjusted so that θPmax=15° ATDC in response to the start of stoichiometric control.

Note that, in the present embodiment, when switching the ignition timing from the control amount for region A to the control amount for region B, torque fluctuations are suppressed by temporarily retarding the ignition timing to cause the ignition timing to gradually change to the control amount for region B. Further, in the present embodiment, when switching the ignition timing from the control amount for region B to the control amount for region A, torque fluctuations are suppressed by, conversely, switching to the control amount for region A after gradually retarding the ignition timing.

The control amounts for region A are used as they are in both region A and region B for the VVT, the injection sharing ratio, the fuel pressure of the in-cylinder injection valve 22, and the WGV. Accordingly, as illustrated by solid lines in FIG. 4, there is no change in each of the aforementioned control amounts while transitioning from region A to region B. Note that, although not illustrated in the drawings, switching is performed as shown in FIG. 3 with respect to the working angle and TCV control amounts also. In FIG. 4, for comparison purposes, the manner in which the control amounts of the VVT, the injection sharing ratio, the fuel pressure and the WGV change when using a map for region C is illustrated by dashed lines.

(2) Control when Transitioning from Region B to Region C

The situation when transitioning from region B to region C is as follows. The degree of throttle opening in region C is greater than in region B and less than in region A. An increase in the degree of throttle opening at the time of transition from region B to region C is discontinuous, and is different to the time of transition from region A to region B which is a time that the degree of opening is gradually decreased.

The control amounts for the VVT, the injection sharing ratio, the fuel pressure and the WGV are switched to the control amounts for region C that are respectively shown in FIG. 3 at the stage at which the engine operation transitions from region B to region C. More specifically, in the present embodiment, as shown in FIG. 4, with respect to the VVT, the control amount of the variable valve mechanism on the intake side is decreased, the control amount of the variable valve mechanism on the exhaust side is increased, and the valve overlap amount is increased. With respect to the injection sharing ratio, the proportion of the port injection valve 20 is decreased and the direct-injection proportion is increased, and the fuel pressure is increased. With regard to the WGV control amount, the waste gate valve 46 is opened.

(3) when Transitioning from Region C to Region B it is Sufficient to Perform the Control for a Time of Transitioning from Region B to Region C in the Opposite Direction, and when Transitioning from Region B to Region A it is Sufficient to Perform the Control for a Time of Transitioning from Region A to Region B in the Opposite Direction.

Figure 5A:
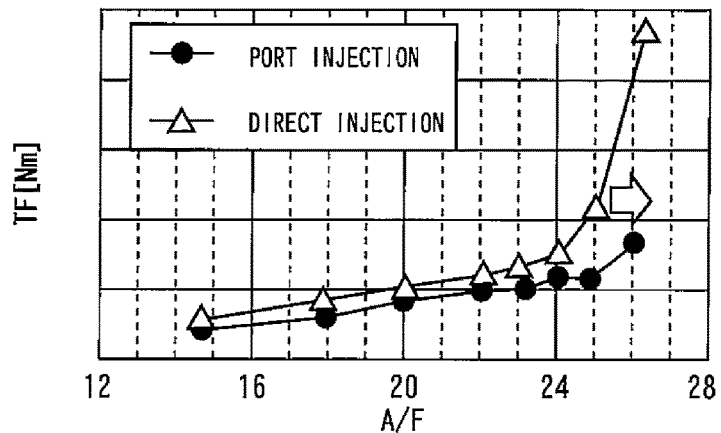
FIG. 5A is a graph for describing effects of the control device for an internal combustion engine according to the embodiment of the present invention.
Figure 5B:
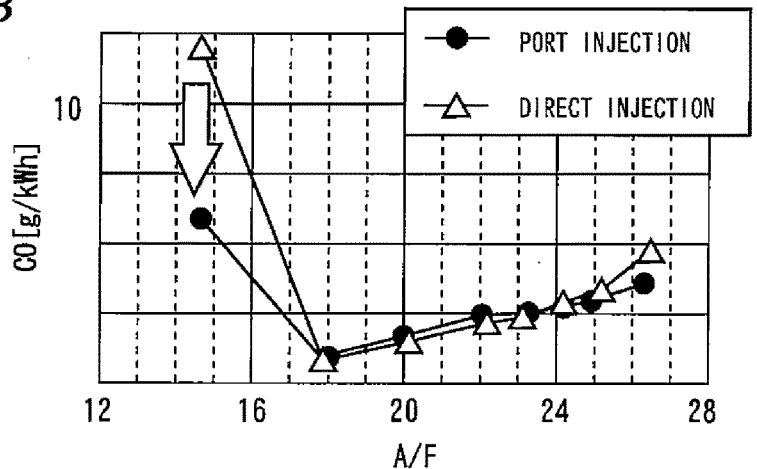
FIG. 5B is a graph for describing effects of the control device for an internal combustion engine according to the embodiment of the present invention.
Figure 5C:
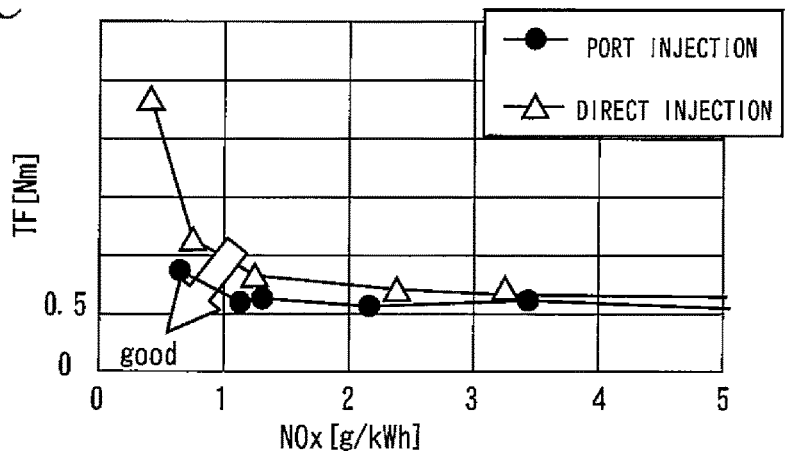
FIG. 5C is a graph for describing effects of the control device for an internal combustion engine according to the embodiment of the present invention.

FIGS. 5A-C are graphs for describing effects of the control device for an internal combustion engine according to the embodiment of the present invention. More specifically, FIGS. 5A-C illustrate advantages of increasing the port injection proportion in the homogeneous lean operation region. FIG. 5A is a graph that illustrates the relation between the air-fuel ratio and torque fluctuations (that is, combustion stability). Since port injection increases the lean limit in comparison to direct injection, it is preferable to increase the port injection proportion in the homogeneous lean operation region A. FIG. 5B is a graph that illustrates the relation between the air-fuel ratio and a homogeneity index CO. As indicated by an arrow in FIG. 5B, port injection can increase the homogeneity in comparison to direct injection. FIG. 5C illustrates the relation between NOx and torque fluctuations (combustion stability). Because of the above described effects of improving the lean limit and homogeneity that are illustrated in FIGS. 5A and 5B, port injection can reduce NOx in comparison to direct injection.

Figure 6:
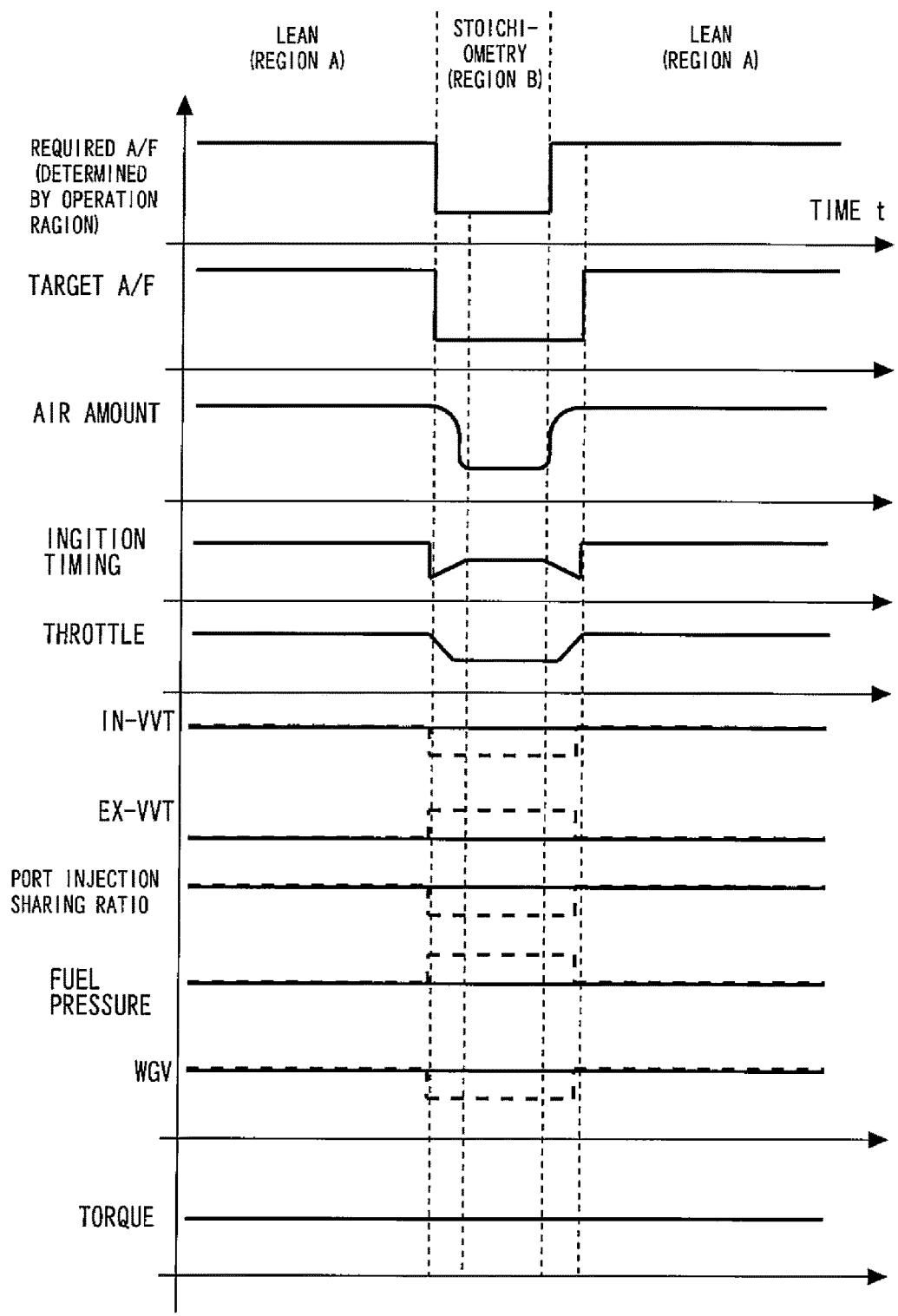
FIG. 6 is a timing chart illustrating operations of the control device for an internal combustion engine according to the embodiment of the present invention.

FIG. 6 is a timing chart illustrating operations of the control device for an internal combustion engine according to the embodiment of the present invention. FIG. 6 illustrates a time chart that shows operations when performing a rich-spike operation in the homogeneous lean operation region A. The required air-fuel ratio during operation in region A is lean. At such time, the air-fuel ratio is temporarily controlled to the rich side by means of a rich-spike operation, and the operation region becomes the region B.

In the present embodiment, the target air-fuel ratio is switched discontinuously from a lean air-fuel ratio (for example, an air-fuel ratio=26) to a rich air-fuel ratio, and a so-called intermediate air-fuel ratio, such as an air-fuel ratio=18, is not used. The intake air amount is changed in accordance with the target air-fuel ratio, and the degree of opening of the throttle valve 40 is also decreased in region B.

As described above, the control amount for region C is used for the ignition timing in region B. That is, the ignition timing is controlled so that $\theta Pmax=12°$ ATDC in region A, whereas the ignition timing is adjusted so that $\theta Pmax=15°$ ATDC in response to a switch to region B accompanying the start of a rich-spike operation.

Note that, in the present embodiment, when switching the ignition timing from the control amount for region A to the control amount for region B, the torque is adjusted by temporarily retarding the ignition timing to cause the ignition timing to gradually change to the control amount for region B. Further, in the present embodiment, when switching the ignition timing from the control amount for region B to the control amount for region A, the torque is adjusted by, conversely, switching to the control amount for region A after gradually retarding the ignition.

The control amounts for region A are used as they are during switching from region A→region B→region A with respect to the VVT, the injection sharing ratio, the fuel pressure, and the WGV. Accordingly, as illustrated in FIG. 4, there is no change in any of the aforementioned control amounts. Note that, although not illustrated in the drawings, switching is performed as shown in FIG. 3 with respect to the TCV control amounts also.

Figure 7:
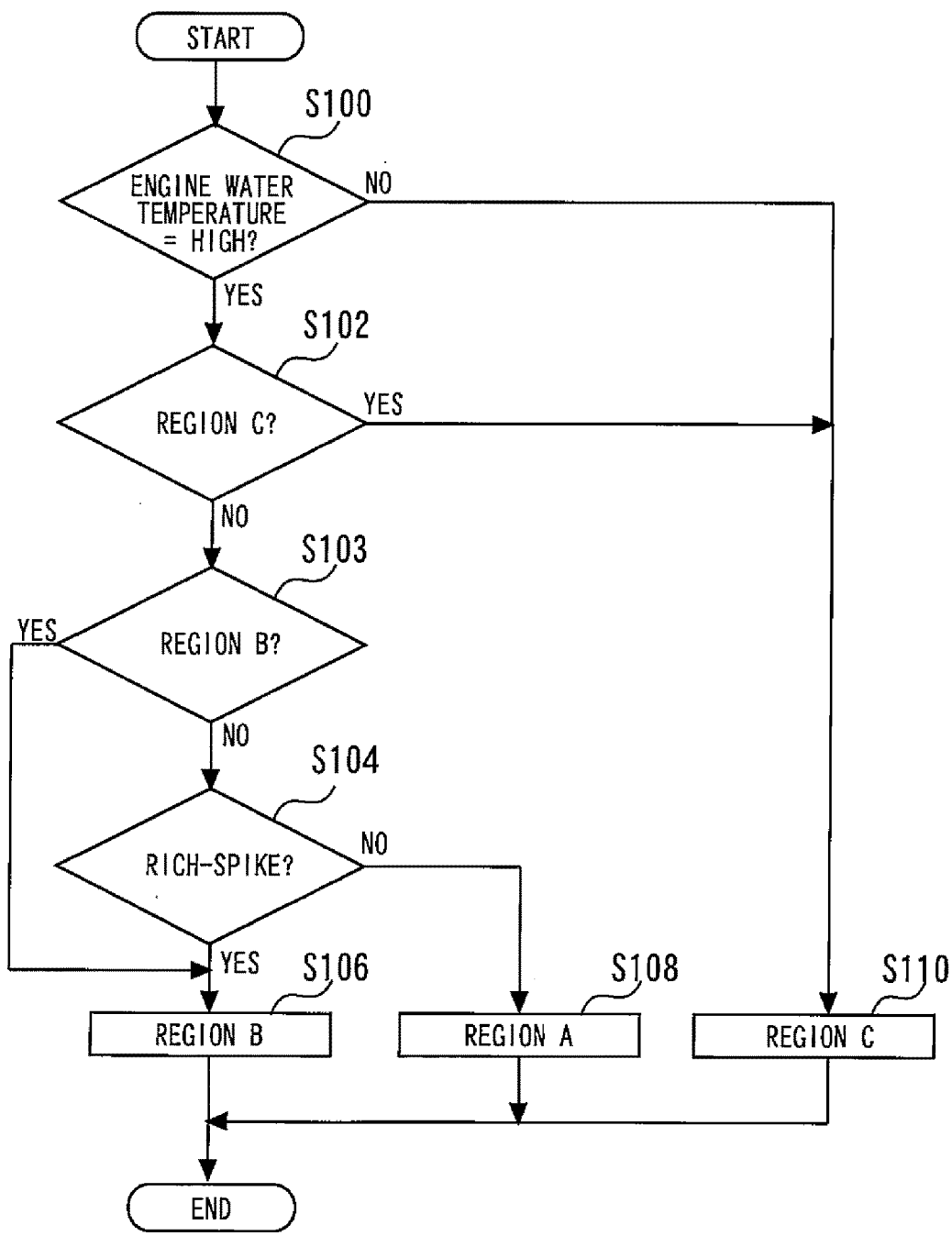
FIG. 7 is a flowchart illustrating the contents of control executed by the control device for an internal combustion engine according to the embodiment of the present invention.

FIG. 7 is a flowchart illustrating the contents of control executed by the control device for an internal combustion engine according to the embodiment of the present invention. In the routine shown in FIG. 7, first, the control device 50 executes processing that determines whether or not the engine water temperature is equal to or greater than a predetermined value (step S100). If the result determined in step S100 is negative, the control device 50 executes the engine control for the normal stoichiometric operation region C (step S110). Thereafter, the current routine ends.

If the result determined in step S100 is that the engine water temperature is equal to or greater than the predetermined value, next, the control device 50 executes processing that determines whether or not the operation region is region C (step S102). If the result determined in step S102 is affirmative, the control device 50 executes the engine control for the normal stoichiometric operation region C (step S110). Thereafter, the current routine ends.

If it is not determined in step S102 that the operation region is region C, next the control device 50 executes processing that determines whether or not the operation region is region B (step S103). If the result determined in step S103 is affirmative, the control device 50 executes the engine control for region B (step S106). Thereafter, the current routine ends.

If it is not determined in step S103 that the operation region is region B, next the control device 50 executes processing that determines whether or not the current time corresponds to a timing at which a rich-spike operation should be executed (step S104). If the result determined in step S104 is negative, the control device 50 executes the engine control for the homogeneous lean operation region A (step S108). Thereafter, the current routine ends.

If the result determined in step S104 is affirmative, the control device 50 advances to step S106 to execute engine control using the control amounts for region B in order to perform a rich-spike operation. Thereafter, the current routine ends.

According to the above described routine, control for the respective regions A to C can be appropriately performed in accordance with the engine water temperature and the current operation region.

Note that, in the above described embodiment, although a form was described in which operation is switched between region A as a lean operation region and region C as a stoichiometric operation region, the present invention is not limited thereto. Region C may be a rich operation region. Further, the term "rich-spike operation" in the above described embodiment is not limited to control that temporarily makes the air-fuel ratio a rich ratio, but also includes control that temporarily makes the air-fuel ratio α stoichiometric ratio.

Note that, according to the technology discussed in Japanese Patent Laid-Open No. 11-280505 a target air-fuel ratio is continuously changed between rich and lean. When the target air-fuel ratio is continuously changed, a period arises in which engine operation is performed under a so-called intermediate air-fuel ratio such as an air-fuel ratio=18. Engine operation under an intermediate air-fuel ratio is not preferable since the amount of generated NOx increases. To avoid the occurrence of such a situation, it is conceivable to discontinuously switch the air-fuel ratio without using an intermediate air-fuel ratio when changing the operation region between lean and stoichiometric or when changing the operation region between lean and rich. In this respect, the control device 50 according to the embodiment of the present invention is a device that switches between lean and stoichiometric operation regions or between lean and rich operation regions without using an intermediate air-fuel ratio. Therefore, the control device 50 according to the embodiment can attain compatibility between combustion stability and favorable fuel consumption, and can also obtain favorable emission characteristics.

Note that, in the foregoing embodiment, as illustrated in FIG. 3, when operating in region B and when executing a rich-spike operation in region A, the control device 50 uses control amounts for region A with respect to all of the VVT, the working angle, the injection sharing ratio, the fuel pressure, the TCV degree of opening, and the WGV degree of opening. However, the present invention is not limited thereto.

A configuration may also be adopted in which, among the control items enumerated above, only the control amount for the VVT is made equal to that for region A, and the remaining control amounts are made equal to those for region C. Alternatively, a configuration may be adopted in which only the control amount for the working angle is made equal to that for region A, and the remaining control amounts are made equal to those for region C. Alternatively, a configuration may be adopted in which only the control amount for the injection sharing ratio is made equal to that for region A, and the remaining control amounts are made equal to those for region C. Alternatively, a configuration may be adopted in which only the control amount for the fuel pressure is made equal to that for region A, and the remaining control amounts are made equal to those for region C. Alternatively, a configuration may be adopted in which only the control amount for the TCV degree of opening is made equal to that for region A, and the remaining control amounts are made equal to those for region C. Alternatively, a configuration may be adopted in which only the control amount for the WGV degree of opening is made equal to that for region A, and the remaining control amounts are made equal to those for region C. Alternatively, a configuration may be adopted in which only control amounts of a plurality of control items selected from the VVT, the working angle, the injection sharing ratio, the fuel pressure, the TCV degree of opening, and the WGV degree of opening are equal to those for region A, and the remaining control amounts are made equal to those for region C.

What is claimed is:

1. An internal combustion engine comprising:
a variable valve mechanism;
a spark plug; and
a control device, wherein:
the control device controls a first control amount of the variable valve mechanism and a second control amount of the spark plug, the first control amount of the variable valve mechanism and the second control amount of the spark plug in a homogeneous lean operation region are different from the first control amount of the variable valve mechanism and the second control amount of the spark plug in a non-lean operation region, the homogeneous lean operation region is set in a first load region, the non-lean operation region is a stoichiometric or rich operation region set in a second load region, the second load region is higher than the first load region,
the control device performs control, in an other operation region set in a third load region, so that an air-fuel ratio of the internal combustion engine in the other operation region is equal to an air-fuel ratio of the internal combustion engine in the non-lean operation region, the first control amount of the variable valve mechanism in the other operation region is equal to the first control amount of the variable valve mechanism in the homogeneous lean operation region and the second control amount of the spark plug in the other operation region is equal to the second control amount of the spark plug in the non-lean operation region in accordance with an operation amount of an accelerator pedal, and the third load region is determined between the first load region and the second load region.

2. The internal combustion engine according to claim 1, further comprising a port injection valve and an in-cylinder injection valve, wherein
the control device controls an injection sharing ratio so that the injection sharing ratio in the homogeneous lean operation region is different from the injection sharing ratio in the non-lean operation region, and
the control device performs control, in the other operation region set in the third load region, so that the injection sharing ratio in the other operation region is equal to the injection sharing ratio in the homogeneous lean operation region in accordance with the operation amount of the accelerator pedal.

3. The internal combustion engine according to claim 1, further comprising a waste gate valve, wherein
the control device controls the waste gate valve so that in the homogeneous lean operation region the waste gate valve is closed or a degree of opening of the waste gate valve is equal to a predetermined opening degree, the degree of opening of the waste gate valve in the non-lean operation region is greater than the degree of opening of the waste gate valve for the homogeneous lean operation region, and
the control device performs control, in the other operation region set in the third load region, so that the degree of opening of the waste gate valve in the other operation region is equal to the degree of opening of the waste gate valve in the homogeneous lean operation region.

4. The internal combustion engine according to claim 1, further comprising a tumble control valve, wherein
the control device controls the tumble control valve so that in the homogeneous lean operation region the tumble control valve is closed or a degree of opening of the tumble control valve is equal to a predetermined opening degree, the degree of opening of the tumble control valve in the non-lean operation region is greater than the degree of opening of the tumble control valve for the homogeneous lean operation region, and
the control device performs control, in the other operation region set in the third load region, so that the degree of opening of the tumble control valve in the other operation region is equal to the degree of opening of the tumble control valve in the homogeneous lean operation region.

5. An internal combustion engine comprising:
a port injection valve;
an in-cylinder injection valve;
a variable valve mechanism;
a spark plug; and
a control device, wherein:
the control device controls a first control amount of the variable valve mechanism and a second control amount of the spark plug, the first control amount of the variable valve mechanism and the second control amount of the spark plug in a homogeneous lean operation region are different from the first control amount of the variable valve mechanism and the second control amount of the spark plug in a non-lean operation region, the homogeneous lean operation region is set in a first load region, the non-lean operation region is a stoichiometric or rich operation region set in a second load region, the second load region is higher than the first load region,
the control device performs control, when a rich-spike is executed, so that the first control amount of the variable valve mechanism when the rich-spike is executed is equal to the first control amount of the variable valve mechanism in the homogeneous lean operation region and the second control amount of the spark plug when the rich-spike is executed is equal to the second control amount of the spark plug in the non-lean operation region, the rich-spike is a temporal stoichiometric or rich operation in the homogeneous lean operation,
the control device controls an injection sharing ratio so that the injection sharing ratio in the homogeneous lean operation region is different from the injection sharing ratio in the non-lean operation region, and
the control device performs control, when the rich-spike is executed, so that the injection sharing ratio when the rich-spike is executed is equal to the injection sharing ratio in the homogeneous lean operation region in accordance with an operation amount of an accelerator pedal.

6. An internal combustion engine comprising:
a waste gate valve;
a variable valve mechanism;
a spark plug; and
a control device, wherein:
the control device controls a first control amount of the variable valve mechanism and a second control amount of the spark plug, the first control amount of the variable valve mechanism and the second control amount of the spark plug in a homogeneous lean operation region are different from the first control amount of the variable valve mechanism and the second control amount of the spark plug in a non-lean operation region, the homogeneous lean operation region is set in a first load region, the non-lean operation region is a stoichiometric or rich operation region set in a second load region, the second load region is higher than the first load region,
the control device performs control, when a rich-spike is executed, so that the first control amount of the variable valve mechanism when the rich-spike is executed is equal to the first control amount of the variable valve mechanism in the homogeneous lean operation region and the second control amount of the spark plug when the rich-spike is executed is equal to the second control amount of the spark plug in the non-lean operation region, the rich-spike is a temporal stoichiometric or rich operation in the homogeneous lean operation,
the control device controls the waste gate valve so that in the homogeneous lean operation region the waste gate valve is closed or a degree of opening of the waste gate valve is equal to a predetermined opening degree, and the degree of opening of the waste gate valve in the non-lean operation region is greater than the degree of opening of the waste gate valve for the homogeneous lean operation region, and
the control device performs control, when the rich-spike is executed, so that the degree of opening of the waste gate valve when the rich-spike is executed is equal to the degree of opening of the waste gate valve in the homogeneous lean operation region.

7. The internal combustion engine according to claim 1, further comprising a fuel injection valve and a fuel pump configured to change a fuel pressure of fuel injected by the fuel injection valve, wherein:
the control device controls the fuel pressure so that the fuel pressure in the homogeneous lean operation region is different from the fuel pressure in the non-lean operation region, and
the control device performs control, in the other operation region set in the third load region, so that the fuel pressure in the other operation region is equal to the fuel pressure in the homogeneous lean operation region in accordance with the operation amount of the accelerator pedal.

8. An internal combustion engine comprising:
a fuel injection valve;
a fuel pump configured to change a fuel pressure of fuel injected by the fuel injection valve;
a variable valve mechanism;
a spark plug; and
a control device, wherein:
the control device controls a first control amount of the variable valve mechanism and a second control amount of the spark plug, the first control amount of the variable valve mechanism and the second control amount of the spark plug in a homogeneous lean operation region are different from the first control amount of the variable valve mechanism and the second control amount of the spark plug in a non-lean operation region, the homogeneous lean operation region is set in a first load region, the non-lean operation region is a stoichiometric or rich operation region set in a second load region, the second load region is higher than the first load region,
the control device performs control, when a rich-spike is executed, so that the first control amount of the variable valve mechanism when the rich-spike is executed is equal to the first control amount of the variable valve mechanism in the homogeneous lean operation region and the second control amount of the spark plug when the rich-spike is executed is equal to the second control amount of the spark plug in the non-lean operation region, the rich-spike is a temporal stoichiometric or rich operation in the homogeneous lean operation, the control device controls the fuel pressure so that the fuel pressure in the homogeneous lean operation region is different from the fuel pressure in the non-lean operation region, and the control device performs control, when the rich-spike is executed, so that the fuel pressure when the rich-spike is executed is equal to the fuel pressure in the homogeneous lean operation region in accordance with the operation amount of the accelerator pedal.

* * * * *